United States Patent [19]

Angjelo et al.

[11] Patent Number: 5,479,629
[45] Date of Patent: Dec. 26, 1995

[54] METHOD AND APPARATUS FOR TRANSLATION REQUEST BUFFER AND REQUESTOR TABLE FOR MINIMIZING THE NUMBER OF ACCESSES TO THE SAME ADDRESS

[75] Inventors: Harry F. Angjelo, Erial, N.J.; John R. Hatersley, Saugerties, N.Y.

[73] Assignee: International Business Machines Corporation, Armonk, N.Y.

[21] Appl. No.: 208,926

[22] Filed: Mar. 11, 1994

Related U.S. Application Data

[63] Continuation of Ser. No. 717,133, Jun. 18, 1991, abandoned.

[51] Int. Cl.⁶ .................................................. G06F 12/10
[52] U.S. Cl. ................................................................ 395/416
[58] Field of Search ................................. 395/400, 425, 395/325, 250, 500, 650

[56] References Cited

U.S. PATENT DOCUMENTS

| | | | |
|---|---|---|---|
| 4,598,362 | 7/1986 | Kinjo et al. | 395/250 |
| 4,841,476 | 6/1989 | Mitchell et al. | 395/500 |
| 4,928,224 | 5/1990 | Zulian | 395/325 |
| 4,965,719 | 10/1990 | Shoens et al. | 395/650 |
| 5,081,622 | 1/1992 | Nassehi et al. | 370/85.2 |

FOREIGN PATENT DOCUMENTS

| | | |
|---|---|---|
| 0352633 | 1/1990 | European Pat. Off. |
| 1065649 | 3/1989 | Japan . |
| 2082808 | 3/1982 | United Kingdom . |

*Primary Examiner*—Reba I. Elmore
*Assistant Examiner*—B. James Peikari
*Attorney, Agent, or Firm*—Whitham, Curtis, Whitham & McGinn; Floyd A. Gonzalez

[57] ABSTRACT

Duplicate translations resulting from multiple requests for address translations from a plurality of address generators are eliminated by the addition of a DLAT address buffer. If the address requested is a hit in the DLAT, the translation is handled in the conventional manner. If there is a miss, the address is put into the DLAT address buffer. Future requests from other address generators are compared with the addresses in the DLAT address buffer to see if there is an outstanding request for this address. If not, the addresses are also entered into the buffer. If there is an outstanding request, the requestor is marked in an address distributor as wanting the address. When the translation is returned from the BCE, the address is sent to all requestors wanting the address, to the DLAT and to the buffer for deletion from the buffer.

10 Claims, 5 Drawing Sheets

METHOD AND APPARATUS FOR TRANSLATION REQUEST BUFFER AND REQUESTOR TABLE FOR MINIMIZING THE NUMBER OF ACCESSES TO THE SAME ADDRESS

CROSS-REFERENCE TO RELATED APPLICATION

This is a continuation of application No. 07/717,133 filed Jun. 18, 1991, now abandoned.

The subject matter of this application is related to that of U.S. Pat. No. 5,341,485 filed May 7, 1991, filed by John Hattersley for MULTIPLE VIRTUAL ADDRESS TRANSLATION PER COMPUTER CYCLE and assigned to the assignee of this application. The disclosure of U.S. Pat. No. 5,341,485 is incorporated herein by reference.

DESCRIPTION

BACKGROUND OF THE INVENTION

1. Field of the Invention

The present invention generally relates to virtual storage mechanisms for data processing systems and, more particularly, to an efficient translation mechanism that eliminates multiple requests for the same page translation with multiple address generators.

2. Description of the Prior Art

Virtual storage organization and management for data processing systems are described, for example, by Harvey M. Deitel in *An Introduction to Operating Systems*, Addison-Wesley (1984), by Harold Lorin and Harvey M. Deitel in *Operating Systems*, Addison-Wesley (1981), and by Harold S. Stone in *High- Performance Computer Architecture*, Addison-Wesley (1987). In a virtual storage system, paging is a relocation and address-to-physical-location binding mechanism providing the user of the system with what appears to be a considerably larger memory space than is really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look aside table (DLAT), sometimes referred to as a translation look-aside buffer (TLB), which stores recent virtual address translations. For virtual addresses stored in the DLAT, the translation process requires only a single or, at most, a couple of machine cycles. For addresses not stored in the DLAT, the DAT process may take from fifteen to sixty cycles or more. The translation mechanism that performs the translation of addresses not stored in the DLAT is referred to as the buffer control element (BCE).

Translations from the virtual address to the real address must be made to find where the addressed instruction or data is in main memory. In typical applications, a processor generates only one address per cycle. Some processors have more than one address generator going to a DLAT (or TLB), but still only one address is actually translated per cycle. As processors have evolved, there has developed a need to generate and translate more than a single address per cycle. Specifically, the processor requires more than one memory request every cycle to be fully utilized. The requests may be, for example, three separate instructions so that three addresses must be generated every cycle to make the memory requests. The above-referenced U.S. Pat. No. 5,341,485 to Hattersley describes several address translation mechanisms which support multiple address generators.

When multiple address generators are running in parallel, either with their own DLAT mechanism or with a shared DLAT mechanism, there is the possibility that a request for the translation of the same page address will be made by a plurality of the address generators. If the translation is not already in the DLAT, then the translation requests are made to the BCE. Each of the translation requests to the BCE are queued, and the translations are each made thereby greatly increasing the translation times.

SUMMARY OF THE INVENTION

It is therefore an object of the present invention to provide an efficient translation mechanism that eliminates multiple requests for the same page translation with multiple address generators.

According to the invention, duplicate translations resulting from multiple requests for address translations from a plurality of address generators are eliminated by the addition of a DLAT address buffer. If the address requested is a hit in the DLAT, the translation is handled in the conventional manner. If there is a miss, the address is put into the DLAT address buffer. Future requests from other address generators are compared with the addresses in the DLAT address buffer to see if there is an outstanding request for this address. If not, the addresses are also entered into the buffer. If there is an outstanding request, the requestor is marked in an address distributor as wanting the address. When the translation is returned from the BCE, the address is sent to all requestors needing it, to the DLAT and to the buffer for deletion from the buffer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
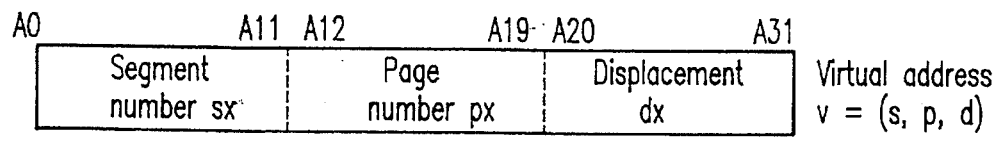
FIG. 1 is a block diagram illustrating the format of a virtual address.

The description which follows uses the term "DLAT" for dynamic look-aside table, but those skilled in the art will understand that this term may be used interchangeably with "TLB" for translation look-aside buffer. For purposes of the following description, a paging/segmentation virtual address system is assumed. In such systems, the virtual address format is as shown in FIG. 1 and comprises s-bits for the segment index (SX), p-bits for the page index (PX), and d-bits for the displacement index (DX). The virtual address may be, for example, 32 bits of which bits A0 through A11 comprise the segment bits, bits A12 through A19 comprise the page bits, and bits A20 through A31 comprise the displacement bits.

Figure 2:
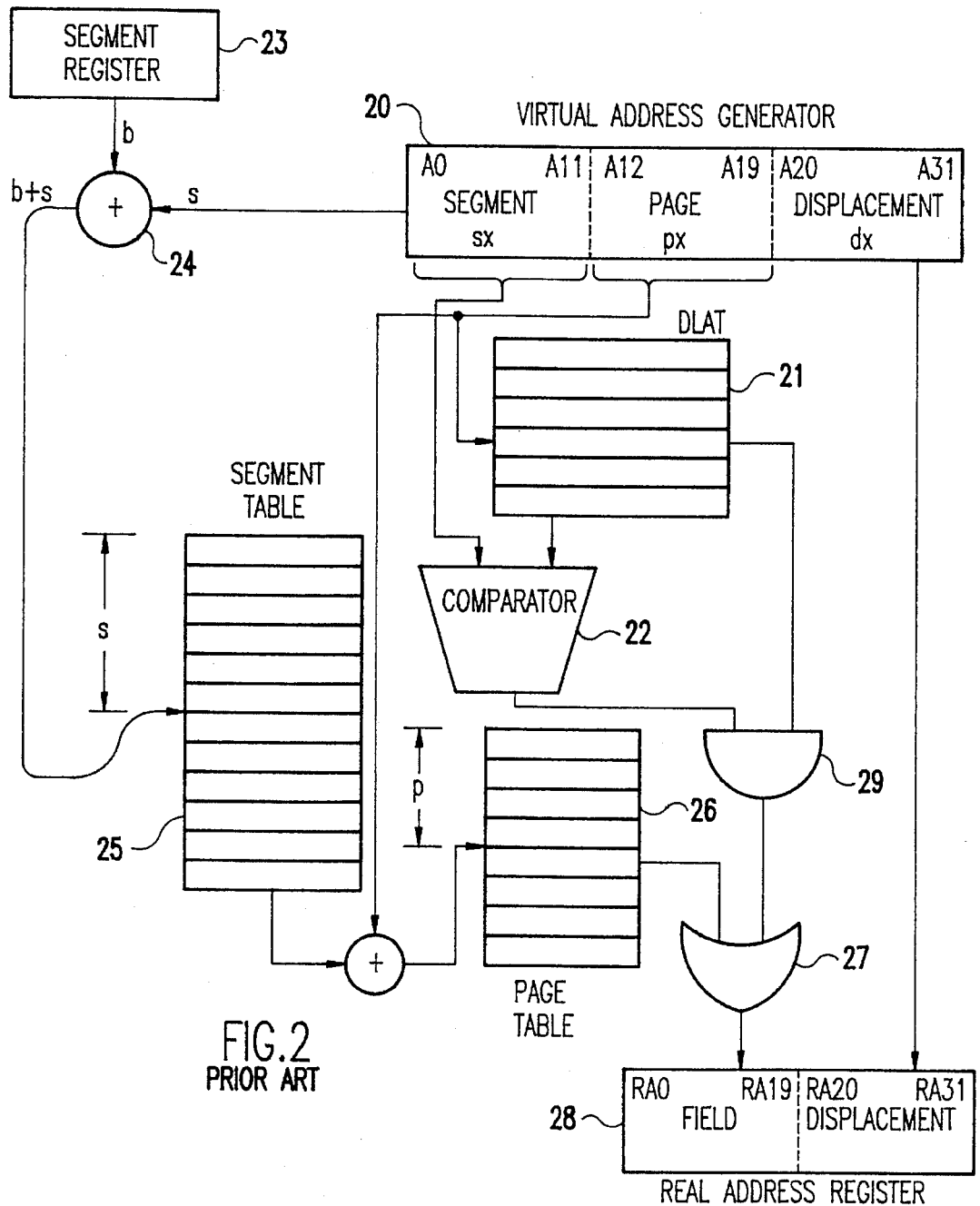
FIG. 2 is a block diagram of a conventional dynamic address translation structure capable of translating (at most) one address per processor cycle.

As shown in FIG. 2, the virtual address is generated by address generator 20. The address generator 20 is part of a central processing unit (CPU) (not shown). The most recently referenced pages have entries in the DLAT 21. For a DLAT with 256 congruence classes, bits A12 through A19 of the virtual address are used to address the DLAT. The virtual page identification bits from the addressed entry read out of the DLAT 21 are compared in comparator 22 with bits A1 through A11 of the virtual address. If there is no match, a DLAT miss has occurred. On a DLAT miss, address translation is obtained through, for example, a segment/page table search and placed in the DLAT. The structure which performs this search is referred to as the buffer control element (BCE).

The segment/page table search begins by adding the value in the segment table origin register 23 and the bits A0 to A12 of the virtual address in adder 24 to obtain an index value for the segment map table 25. The entry output from the segment map table 25 is, in turn, used as an index for the page map table 26 entry, there being a separate page map table for each segment. The entry output from the page map table 26 provides the page frame at which the virtual page resides in real storage and is passed by OR gates 27 and concatenated with the displacement bits A20 through A31 of the virtual address generator 20 to form the real address in real address register 28.

On the other hand, if there is a match in the DLAT 21, the comparator 22 enables AND gates 29 which passes the entry output from the DLAT 21 to OR gates 27. In this case, the entry output from the DLAT 21 is the associated real address field which is concatenated to the displacement bits A20 through A31 to form the real storage address in register 28. Obviously, this process of address translation is considerably faster than that of the segment/page table search which occurs on a DLAT miss. The segment/page table search may take fifteen to eighty cycles to complete, whereas a DLAT access can be completed in one cycle.

Normally, most address translation requests are made by a search of the DLAT, and while the segment/page table search takes a greater number of processor cycles than making the translation by means of the DLAT, the segment/page table search is itself not without the possibility of a translation failure. For example, the segment map table search may indicate that the segment is not in primary or main storage, causing the operating system to locate the segment on secondary storage, i.e., a direct access storage device (DASD), create a page table for the segment, and load the appropriate page into primary storage, possibly replacing an existing page in the process.

Even if the segment is in primary storage, the desired page may not be in primary storage, causing the operating system to locate the page on secondary storage and loading the page in primary storage, again possibly replacing an existing page in the process. The process of accessing secondary storage can take up to several hundred processor cycles.

Figure 3:
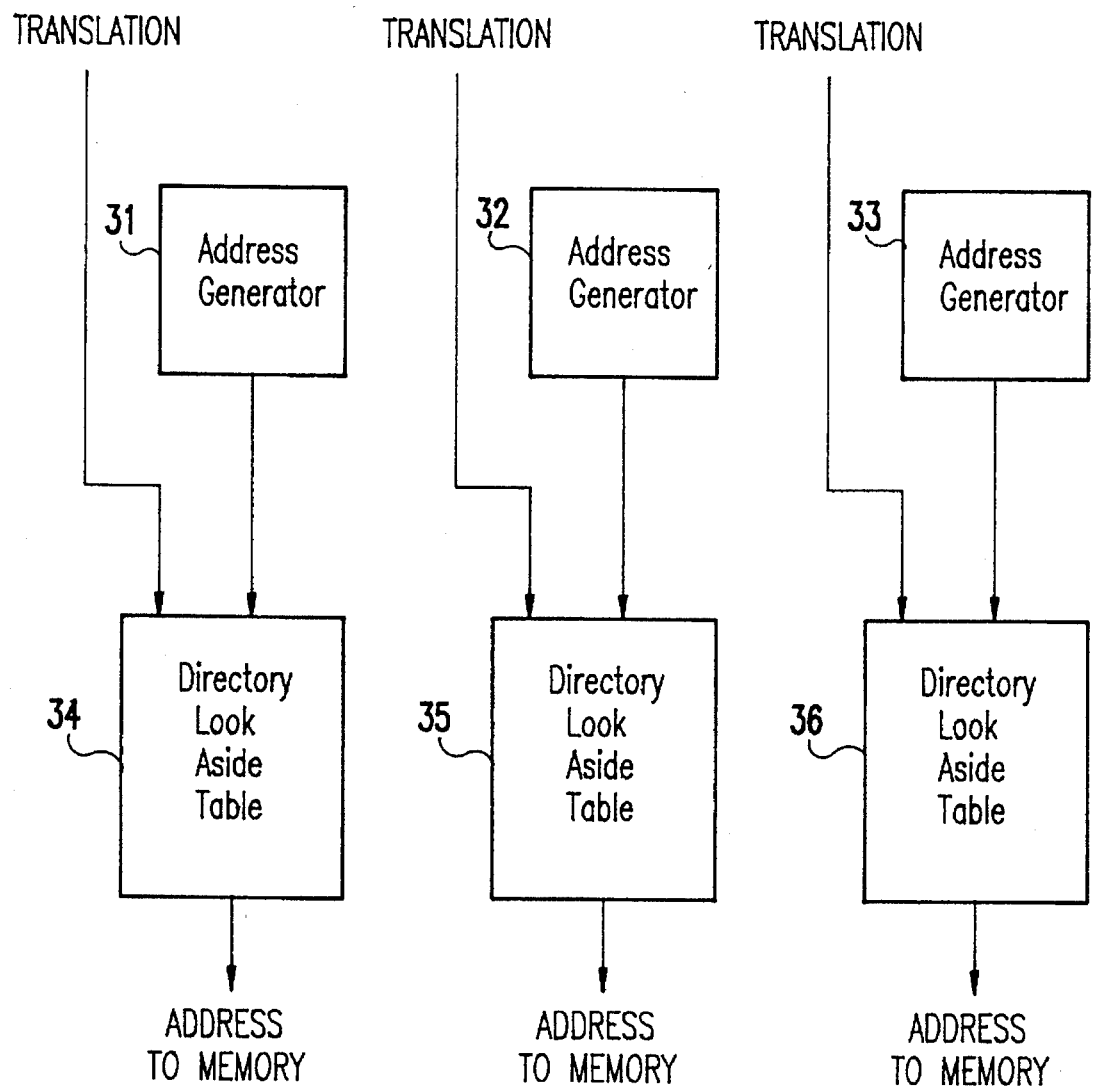
FIG. 3 is a block diagram showing a translation structure in which the DLAT is replicated to provide three independent address generators.

The foregoing description is for a conventional DLAT structure intended to make (at most) one translation per processor cycle. In U.S. Pat. No. 5,341,485 by Hattersley, DLAT structures are disclosed for making multiple translations per processor cycle. For example, FIG. 3 shows a DLAT structure comprising three address generators (AGENs) 31, 32 and 33. Each address generator generates a virtual address and passes the address to its respective DLAT 34, 35 or 36 for a translation. If the DLAT does not have that translation (a DLAT miss), the address must be generated, as previously described. The main problem with this approach is that often the translation will have been made for one DLAT and the same translation will be needed for the others. Thus, for example, the three address generators generate virtual addresses in parallel. If a miss occurs in the first DLAT, this requires N cycles to translate. Similarly, if misses for the same address also occur in the second and third DLATs, each requires N cycles to translate. Since the same translation might be made three times for the same page, a total of 3N cycles might be required for the translation. Note that the translations must be sequentially performed by the operating system.

Figure 4:
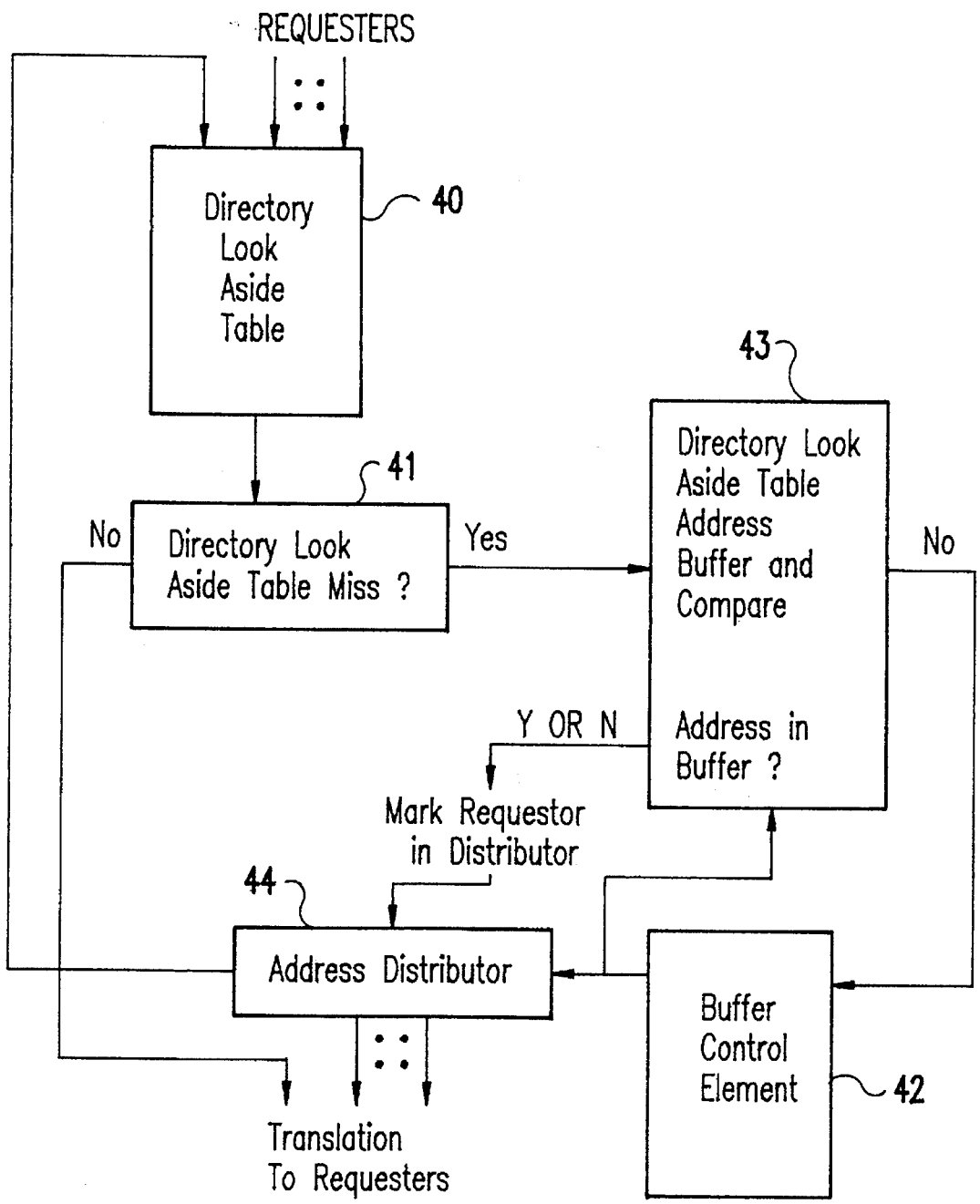
FIG. 4 is a block diagram of the new DLAT structure incorporating a DLAT address buffer according to the invention.

The subject invention modifies the DLAT structure for multiple address generators by adding a DLAT address buffer as shown in FIG. 4. For simplicity, FIG. 4 shows a single DLAT 40 receiving translation requests from multiple requestors (i.e., address generators). As described in the U.S. Pat. No. 5,341,485 by Hattersley, the DLAT 40 may be implemented with multiple DLATs or may, in fact, be a shared DLAT as shown in FIG. 4. The present invention is applicable to either case. In the case of a DLAT miss as detected by DLAT miss logic 41, instead of going immediately to the BCE 42 for address translation, the address to be translated is applied to the DLAT address buffer 43. This address is then compared with other addresses in the buffer to see if there is a matching translation request in the buffer. If not, the address is queued in the buffer 43 for translation by the BCE 42. In addition, the identification (ID) of the requestor and address to be translated are entered into the address distributor 44 to mark or identify or record the requestor that is to receive the translated address from the BCE 42.

If on the other hand, a matching translation request is found in the buffer 43, it is not queued for translation. Instead, an input is made to the address distributor 44 to "mark" or record the requestor to receive the translated address from the BCE 42. The translation may already be in progress or will at least be queued for translation by the BCE 42, but this same address will not be translated a second time since it is not queued in buffer 43.

When the translation of an address is completed by the BCE 42, the translated address is sent to the address distributor 44 which supplies the translated address to each address generator requestor requesting it as indicated by the "mark" recording the entries marking or identifying those requestors in the address distributor 44 to receive the translated address are deleted. The translated address is also supplied by the address distributor 44 to the DLAT 40 so that it will be available for a later request. The BCE 42 also provides data identifying the address just translated to the DLAT address buffer 43. This data is used by the buffer 43 to delete the entry in the queue awaiting translation.

Figure 5:
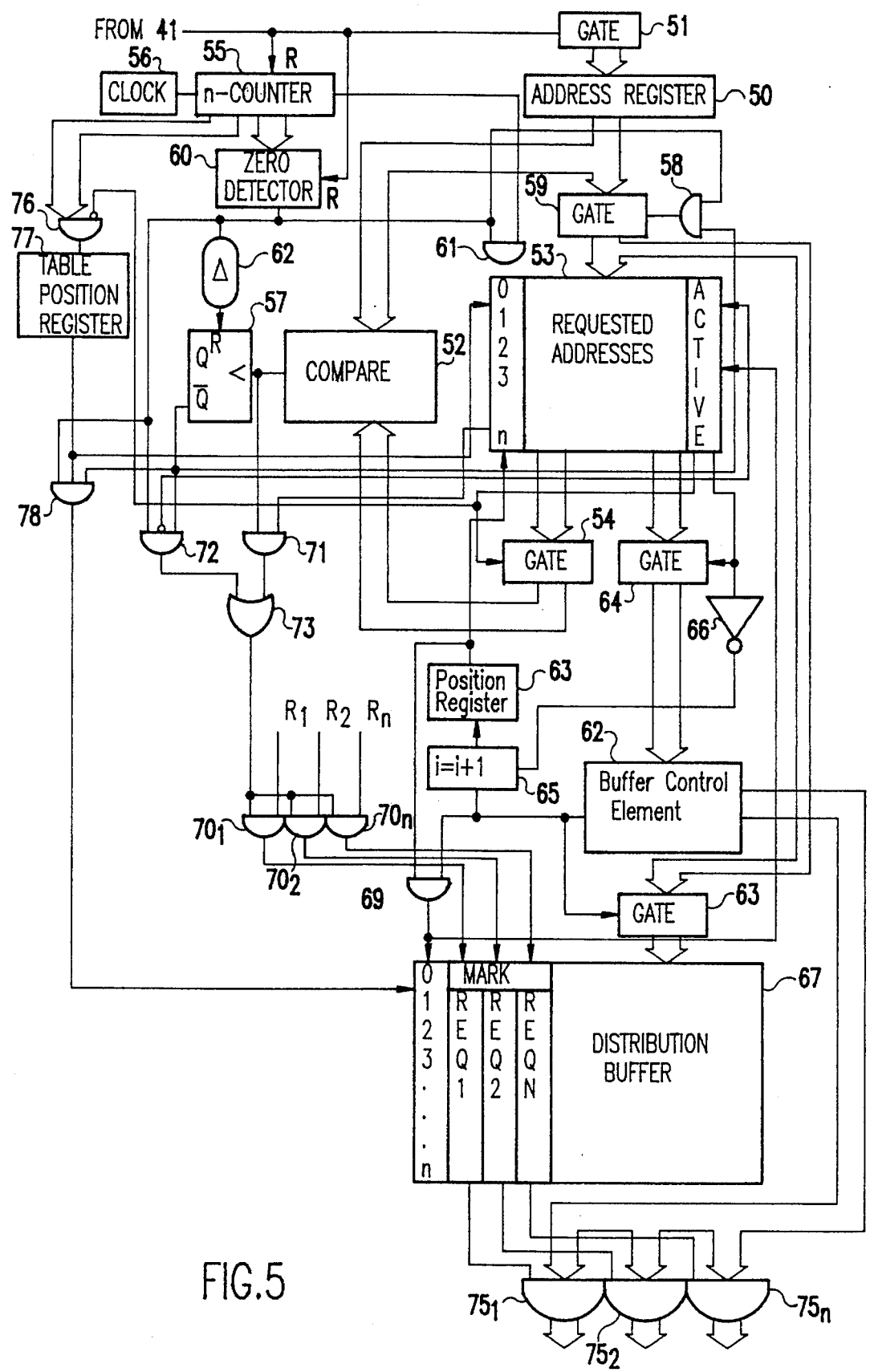
FIG. 5 is a detailed block diagram showing the structure of the DLAT address buffer and address distributor of the DLAT structure shown in FIG. 4.

FIG. 5 shows in more detail the structure of the DLAT address buffer 43 and the address distributor 44. A miss output from DLAT miss logic 41 sends the address to address register 50 via gate 51. The content of address register 50 is compared in compare logic 52 to all active addresses in table 53. The "active addresses" are those addresses that are queued to be sent to the BCE 42 for translation. The addresses to be translated are entered in table 53 and marked active by the "active" bit associated with each entry to be translated in the table 53 starting with position 0 to position n and are wrapped to position 0 as that position becomes available. Thus, the table 53 provides a sequential record of requests to be translated.

The addresses in the table 53 are sequentially read out to comparator logic 52 via gate 54 under the control of an n-stage counter 55 which counts clock pulses from clock 56. Gate 54 is enabled by the "active" bit for each address read out of table 53; therefore, those addresses which do not have their "active" bit set are not passed to the compare logic 52. A compare output from compare logic 52 sets flip-flop 57, and the $\overline{Q}$ output from flip-flop 57 inhibits AND gate 58, preventing the address in address register 50 from being read into table 53 via gate 59.

The counter 55 is reset and started by a signal from DLAT miss logic 41 and is used to step through the register 53. The counter 55 counts to a predetermined number n. n should be a reasonably small number, say four to six per DLAT, to reduce cycle time. A zero detector 60 is set when the counter 55 rolls over to a zero count, indicating the end of a full compare cycle. When the detector 60 is set, it inhibits AND gate 61, thereby preventing further read out of addresses stored in table 53. At this point, if the flip-flop 57 has not been set, the output of the detector 60 enables AND gate 58 to allow the address in address register 50 to be read into table 53 in the next position where the "active" bit has not been set. This is tracked by table position register 77. The register holds the last position of tables 53 and 67 that has no active bit set. This position is input to register 77 via AND gate 76 from counter 55 and is used to identify what position the next address to be translated is to be written to. The "active" bit is set for any new non-compare address, and the address is made non-active when the translation for that position is received and the position is made available. After a short delay 62, the output of the detector 60 also resets flip-flop 57 so as to be ready for a next compare cycle. The detector 60, like the counter 55, is reset by a signal from the DLAT miss logic 41.

The table 53 has dual output ports allowing addresses in the table to be read out of either port under control of separate address inputs. The next queued address to be translated is addressed by position register 63 causing that address to be read out of table 53 via gate 64 to the BCE 42. When that address has been translated, an output from BCE 42 causes incrementing logic 65 to increment the address in position register 63. The "active bit" for addresses read out of table 53 to gate 64 enables gate 64 if set but inhibits gate 64 if not set so that addresses in table 53 which do not require translation will not be read out to BCE 42 for translation. Should an address be read out of table 53 for which the "active bit" is not set, it is necessary to increment the address in position register 63. This is done by inverter 66 which is responsive to an "active bit" which is not set to cause the incrementing logic 65 to increment the address in position register 63.

Address distributor 44 has a table 67 similar to table 53. Addresses to be translated from the BCE 42 are stored in table 67 via gate 68 at a position corresponding to the position of the requested address in table 53. Although it is not necessary to store the addresses in table 67, this choice was made to enhance debugging operations. The position is obtained from position register 77 and passed by AND gate 78 to table 67. The BCE enables both the gate 68 and the AND gate 69 when it completes a translation.

Associated with each position in table 67 are "mark" bit positions for each requestor in the system. When there is a DLAT miss, the requestor identification (ID) enables a corresponding one of AND gates $70_1$, $70_2$, $70_n$ which control the setting of the requestor bits. Whether there is a compare, as determined by AND gate 71, or a no compare, as determined by AND gate 72, the position of the queued address in table 53 is passed by OR gate 73 to AND gates $70_1$, $70_2$, $70_n$ so as to correctly mark the position where the translated address will be stored for the requestors which have requested that address.

When a no compare equal is obtained from compare equal logic 52, the address is entered into the next sequential position of table 53 and the same, sequential position of the address in table 67 is stored in table 77. When an address is received from the BCE 42, it is received in address distributor 44 and distributed to all marked requestors. This is accomplished by means of distribution gates $75_1$, $75_2$, $75_n$ which are enabled by the mark request bits for the address being distributed. Address distributor 44 also invalidates the position reserved for the active position in the tables 53 and 67. This is done with the output of AND gate 69. At the same time, the "mark" bits for the distributed address is reset in table 67, making this position available.

Figure 6:
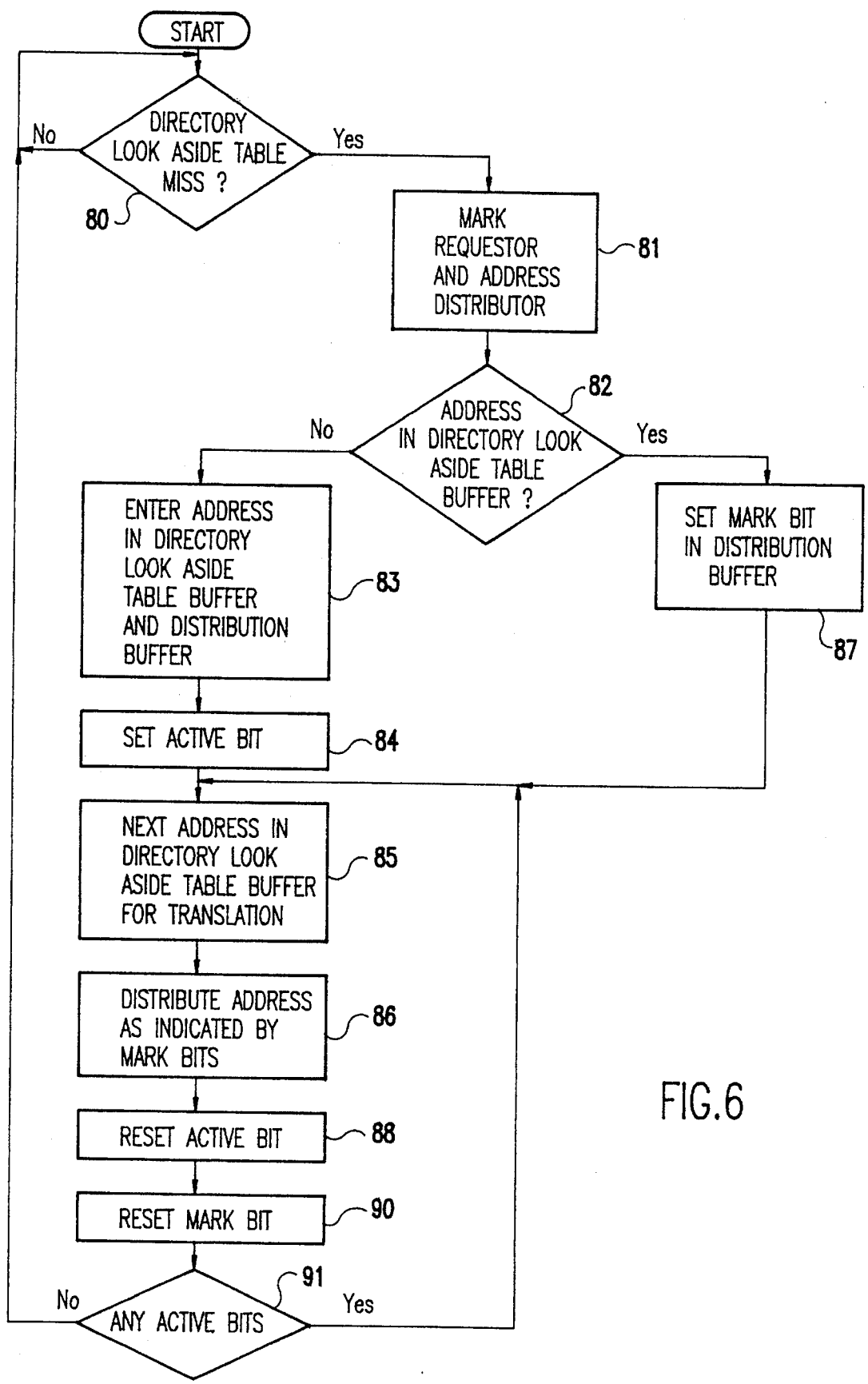
FIG. 6 is a flow diagram showing the logic of the operation of the new DLAT structure according to the invention.

The hardware implementation shown in FIG. 5 may be modified by software support. The logic of the software used to manage tables 53 and 67 is shown in the flow diagram of FIG. 6. The process begins at decision block 80 where a DLAT miss is detected. Upon detection of a DLAT miss, the requestor is marked in table 67 of the address distributor 44, as indicated by function block 81. A test is made in decision block 82 to determine if the requested address is already in the DLAT buffer table 53. If not, the address is entered in the DLAT buffer table 53 and distribution buffer table 67 in function block 83, and at the same time, the "active" bit is set in function block 84. If the requested address is already in the DLAT buffer table 53, then the mark bit is entered in the distribution buffer table 67 in function block 87.

Concurrently with the process of entering addresses in the DLAT buffer table 53, the next address in the DLAT buffer table 53 queued for translation is sent to BCE 42 for translation when the BCE is free, as indicated in function block 85. When the BCE completes a translation, the address is distributed as indicated by the mark bits in function block 86. The related "active" bit is reset in table 53 at function block 88, and the corresponding "mark" bits are reset in table 67 in function block 90.

A test is then made in decision block 91 to determine if there are any "active" bits set in table 53. If so, the process loops back to function block 85; otherwise, the process loops back to decision block 80 to await the next DLAT miss.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An address translation mechanism supporting a plurality of address generators in a data processing system comprising:

table means for storing address translation entries representing addresses to be translated, said table means, operatively coupled to said plurality of address generators, for supplying an address output when an address request from an address generator has a predetermined relationship with a translation entry;

means for detecting when an address request from an address generator does not have a predetermined relationship with a translation entry in said table means;

address buffer and compare means, operatively coupled to said detecting means, for determining whether there is an outstanding request for a translation of an address currently stored for translation and, if there is no such outstanding request, temporarily storing said address for translation;

distribution means, operatively coupled to said address buffer and compare means, for identifying all requestors of address translations for each address stored for translation; and translation means for translating addresses temporarily stored by said address buffer and compare means, said translation means supplying translated addresses to said distribution means for distribution to each of said address generators identified as requesting translated addresses and to said table means, wherein said address buffer and compare means comprises second table means having a plurality of storage locations for storing addresses to be translated, each of said storage locations including an active bit position indicating whether an address is active for translation by said translation means, said address buffer and compare means further comprising compare means for comparing addresses in said second table means with an address requested for translation by said detecting means and for entering an address not found in said second table means.

2. The address translation mechanism recited in claim 1 wherein said distribution means includes means for deleting addresses for translation from said address buffer and compare means when a corresponding translated address is supplied to said distribution means.

3. The address translation mechanism recited in claim 1 wherein said address buffer and compare means further comprises:

marking means responsive to all addresses requested to be translated by said detecting means for any of said address generators for identifying said distribution means for each of said address generators.

4. The address translation mechanism recited in claim 3 wherein said distribution means comprises third table means having storage locations having a predetermined relationship with addresses stored in said second table means for storing translated addresses from said translation means, said storage locations including bit positions assigned to each of said address generators and identified by said address buffer and compare means, and a mark bit position indicating that an address has been identified for distribution.

5. The address translation mechanism recited in claim 4 wherein said distribution means further includes means for resetting said active bit position in said second table means when a corresponding address has been translated by said translation means and for resetting said mark bit position in said third table means when a corresponding translated address has been distributed to said requestors.

6. A method of address translation which supports a plurality of address generators in a data processing system, said method comprising the steps of:

storing, in a table, a plurality of address translation entries representing addresses to be translated and supplying an address output when an address request from an address generator has a predetermined relation with a translation entry of said plurality of translation entries;

detecting when an address request from an address generator does not have a predetermined relation with said translation entry of said plurality of translation entries in said table;

identifying all address generators requesting translations of said addresses for which there is not a corresponding translation entry among the stored plurality of address translation entries;

determining whether there is an outstanding request for a translation of an address temporarily stored for translation using a second table having storage locations with an active bit position indicating whether an address is active for translation and, if there is no such outstanding request, temporarily storing said address for translation in said table with said plurality of translation entries;

translating said plurality of translation entries; and distributing translated addresses to each of said address generators identified as requesting the respective translated addresses.

7. The address translation mechanism recited in claim 2 wherein said address buffer and compare means further comprises:

marking means responsive to all addresses requested to be translated by said detecting means for any of said address generators for identifying said distribution means for each of said address generators.

8. The address translation mechanism according to claim 1, further comprising:

means for inhibiting an address translation of addresses in said table means when said inhibiting means is set and for allowing an address translation of addresses in said table means when said inhibiting means is not set, such that addresses not requiring translation are not read out to said address buffer and compare means for translation, a position register for holding a position of an address to be translated, inverting means coupled to said position register for updating said position of said position register for said address to be translated;

wherein with an address read out of said table means in which said inhibiting means is set, said position of an address is incremented in said position register.

9. The method according to claim 6, wherein said data processing system includes an inhibiting means for inhibiting an address translation, said method further comprising the steps of:

inhibiting an address translation of address translation entries when said inhibiting means is set and for allowing an address translation of said address translation entries when said inhibiting means is not set, such that addresses not requiring translation are not read out for translation, holding a position of an address to be translated; and with an address to be translated read out and said inhibiting means set, incrementing said position of an address.

10. An address translation mechanism supporting a plurality of address generators in a data processing system comprising:

table means for storing address translation entries representing addresses to be translated, said table means, operatively coupled to said plurality of address generators, for supplying an address output when an address request from an address generator has a predetermined relationship with a translation entry;

means for detecting when an address request from an address generator does not have a predetermined relationship with a translation entry of said translation entries in said table means;

address buffer and compare means, operatively coupled to said detecting means, for determining whether there is an outstanding request for a translation of an address currently stored for translation and, if there is no such outstanding request, temporarily storing an address for translation with said translation entries;

distribution means, operatively coupled to said address buffer and compare means, for identifying all requestors of address translations for said addresses stored for translation among the stored plurality of address translation entries; and translation means for translating addresses temporarily stored by said address buffer and compare means, said translation means supplying translated addresses to said distribution means for distribution to each of said address generators identified as requesting translated addresses and to said table means, means for inhibiting an address translation of addresses in said table means when said inhibiting means is set and for allowing an address translation of addresses in said table means when said inhibiting means is not set, such that addresses not requiring translation are not read out to said address buffer and compare means for translation, a position register for holding a position of an address to be translated, inverting means coupled to said position register for updating said position of said position register for an address to be translated;

wherein with an address read out of said table means in which said inhibiting means is set, said position of an address is incremented in said position register wherein said address buffer and compare means comprises second table means having a plurality of storage locations for storing addresses to be translated, each of said storage locations including an active bit position indicating whether an address is active for translation by said translation means, said address buffer and compare means further comprising compare means for comparing addresses in said second table means with an address requested for translation by said detecting means and for entering an address not found in said second table means.

* * * * *